(12) United States Patent
Nishimura et al.

(10) Patent No.: US 8,394,546 B2
(45) Date of Patent: Mar. 12, 2013

(54) FUEL CELL SYSTEM AND CONTROL METHOD THEREOF

(75) Inventors: Hidetaka Nishimura, Yokosuka (JP); Takahito Osada, Yokosuka (JP); Takatada Usami, Yokohama (JP); Ken Nakayama, Yokohama (JP); Kotaro Akashi, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 696 days.

(21) Appl. No.: 12/339,857

(22) Filed: Dec. 19, 2008

(65) Prior Publication Data
US 2009/0169928 A1    Jul. 2, 2009

(30) Foreign Application Priority Data
Dec. 27, 2007    (JP) .................. 2007-337515

(51) Int. Cl.
*H01M 2/00*    (2006.01)
*H01M 8/02*    (2006.01)

(52) U.S. Cl. ..................... 429/429; 429/415
(58) Field of Classification Search .......... 429/415, 429/429
See application file for complete search history.

(56) References Cited

U.S. PATENT DOCUMENTS

| | | | |
|---|---|---|---|
| 2003/0232226 A1* | 12/2003 | Morishima et al. | 429/24 |
| 2005/0053809 A1 | 3/2005 | Hayashi et al. | |
| 2005/0066680 A1 | 3/2005 | Hobmeyr et al. | |
| 2005/0112424 A1 | 5/2005 | Hirano et al. | |
| 2005/0271908 A1 | 12/2005 | Lin et al. | |
| 2006/0280977 A1* | 12/2006 | Sakajo et al. | 429/23 |
| 2007/0141418 A1 | 6/2007 | Ota et al. | |

FOREIGN PATENT DOCUMENTS

| | | | |
|---|---|---|---|
| JP | 7-161371 | | 6/1995 |
| JP | 2002-42846 | | 2/2002 |
| JP | 2005-158426 | * | 6/2005 |
| JP | 2005-259440 | | 9/2005 |
| JP | 2005-317431 | | 11/2005 |
| JP | 2006-099996 | | 4/2006 |
| JP | 2007-35517 | | 2/2007 |
| JP | 2007-149390 | | 6/2007 |
| JP | 2007-184196 | | 7/2007 |
| WO | WO 2007/107836 | | 9/2007 |

\* cited by examiner

*Primary Examiner* — Ula C Ruddock
*Assistant Examiner* — Frank Chernow
(74) *Attorney, Agent, or Firm* — Drinker Biddle & Reath LLP

(57) ABSTRACT

A fuel cell system having a fuel cell for causing reactant gas to be electrochemically reacted to generate power, a reactant gas supply path for supplying reactant gas to the fuel cell, a reactant gas recirculation path for recirculating exhaust gas discharged from the fuel cell and combining the recirculating exhaust gas with reactant gas flowing through the reactant gas supply path to the fuel cell, and a pump unit disposed in the reactant gas recirculation path to pump the recirculating exhaust gas through the reactant gas recirculation path. A pump-tempering apparatus increases the temperature of the pump unit and a controller controls the pump-tempering apparatus. After the controller receives a fuel cell system stop signal, the controller controls the pump-tempering apparatus such that the temperature of the pump unit becomes higher than the temperature of piping in the reactant gas recirculation path.

21 Claims, 10 Drawing Sheets

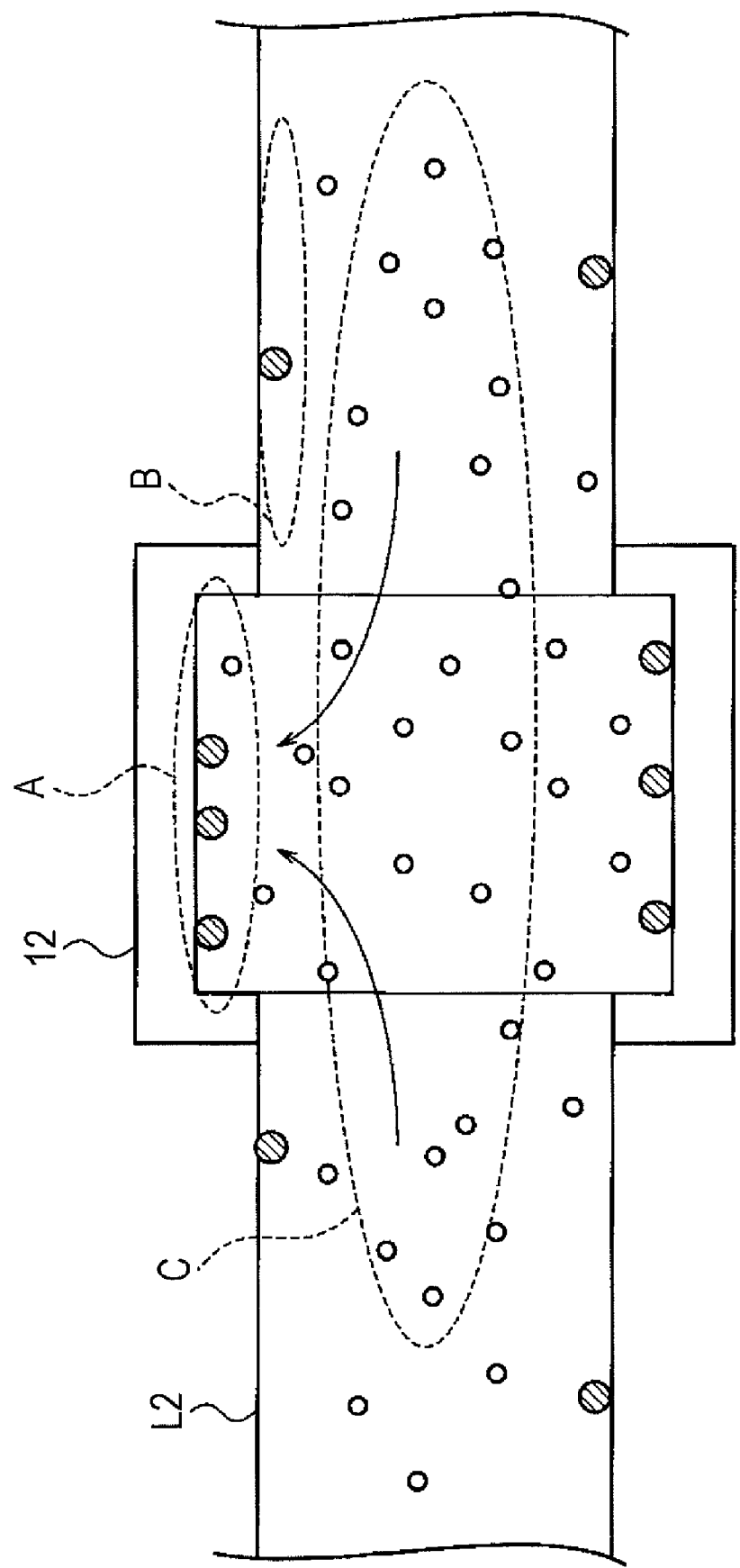

FUEL CELL SYSTEM AND CONTROL METHOD THEREOF

CROSS-REFERENCE TO RELATED APPLICATIONS

This application claims priority to Japanese Patent Application No. P2007-337515 filed Dec. 27, 2007, which is incorporated by reference herein in the entirety.

BACKGROUND OF THE INVENTION

1. Field of the Invention

The present invention relates to a fuel cell system and a control method of the fuel cell system.

2. Description of the Related Art

A fuel cell system having a fuel cell is known in the art. A reactant gas, or fuel gas (for example, hydrogen) is supplied to a fuel electrode in the fuel cell, and oxidizing gas (for example, air) is supplied to an oxidizer electrode in the fuel cell. The reactant gas and the oxidizing gas are electrochemically reacted with each other to generate power electrical power, as long as the fuel gas is being supplied. The electrochemical reaction of hydrogen (in the reactant gas) and oxygen (in the oxidizing gas) forms water vapor, some of which condenses to liquid water before being removed from the fuel cell system. A fuel cell system commonly includes a recirculation path for recirculating exhaust gas discharged from the fuel cell and combining the recirculating exhaust gas with reactant gas being supplied to the fuel cell, and a reactant gas recirculation pump to pump the recirculating exhaust gas through the reactant gas recirculation path.

A problem encountered in such fuel cell systems is that when the fuel cell system is stopped in a low-temperature environment, condensed water vapor can freeze. In particular, condensed water in the reactant gas recirculation path can freeze in the reactant gas recirculation pump, causing the pump to lock up and cease operating.

Prior art methods exist for preventing the reactant gas recirculation pump in the reactant gas recirculation path (i.e., the recirculation path for fuel gas) from being frozen and locked up in a low-temperature environment after operation of the fuel cell system is stopped. In a prior art method, after the fuel cell system is completely stopped, a system controller performs a two-step process, first controlling the recirculation pump to be rotationally driven at a low rotational speed when the recirculation pump temperature, as measured by a thermometer, becomes equal to or lower than a first threshold value, and then stopping the recirculation pump from being rotationally driven at the low rotational speed when the temperature becomes equal to or lower than a second threshold value. However, in the prior art methods, the rotational speed of the recirculation pump is controlled based solely upon the detection of the temperature of the recirculation pump, making it difficult to prevent condensation in the recirculation pump.

SUMMARY OF THE INVENTION

An object of the present invention is to reliably prevent water vapor generated by a fuel cell from condensing and freezing in the reactant gas recirculation pump that recirculates exhaust gas discharged from the fuel cell, thereby preventing the pump from locking up in low-temperature conditions after the fuel cell system is stopped.

In an embodiment of the present invention, a fuel cell system is provided, the fuel cell system having a fuel cell for causing reactant gas to be electrochemically reacted to generate power when reactant gas is supplied, a reactant gas supply path for supplying reactant gas to the fuel cell, a reactant gas recirculation path for recirculating exhaust gas discharged from the fuel cell and combining the recirculating exhaust gas with reactant gas flowing through the reactant gas supply path to the fuel cell, and a pump unit disposed in the reactant gas recirculation path to pump the recirculating exhaust gas through the reactant gas recirculation path. A pump-tempering apparatus is provided for increasing the temperature of the pump unit and a controller is provided for controlling the pump-tempering apparatus. After the controller receives a fuel cell system stop signal, the controller controls the pump-tempering apparatus such that the temperature of the pump unit becomes higher than the temperature of piping in the reactant gas recirculation path.

In another embodiment of the present invention, a fuel cell system is provided having a fuel cell for causing reactant gas to be electrochemically reacted to generate power when reactant gas is supplied, a reactant gas supply path for supplying reactant gas from a reactant gas supply unit to the fuel cell, a reactant gas recirculation path for recirculating exhaust gas discharged from the fuel cell and combining the recirculating exhaust gas with reactant gas flowing through the reactant gas supply path to the fuel cell, and a pump unit disposed in the reactant gas recirculation path to pump the recirculating exhaust gas through the reactant gas recirculation path. A pump-tempering apparatus is provided for increasing the temperature of the pump unit and a controller is provided for performing heating control by causing the pump-tempering apparatus to heat the pump unit using power generated by the fuel cell after the supply of the reactant gas has been stopped based on the controller receiving a fuel cell system stop signal.

In yet another embodiment of the present invention, a stop control method of a fuel cell system is provided, the fuel cell system including a fuel cell for causing reactant gas to be electrochemically reacted to generate power when reactant gas is supplied, a reactant gas supply path for supplying reactant gas to the fuel cell, a reactant gas recirculation path for recirculating exhaust gas discharged from the fuel cell and combining the recirculating exhaust gas with reactant gas flowing through the reactant gas supply path to the fuel cell, and a pump unit disposed in the reactant gas recirculation path to pump the recirculating exhaust gas through the reactant gas recirculation path. The stop control method includes increasing the temperature of the pump unit such that the temperature of the pump unit becomes higher than the temperature of piping in the reactant gas recirculation path, after a fuel cell system stop signal is received. The stop control method further includes stopping the fuel cell system after the pump unit temperature becomes higher than the piping temperature of the reactant gas recirculation path.

In a further embodiment of the present invention, a fuel cell system is provided, the fuel cell system including a fuel cell for causing reactant gas to be electrochemically reacted to generate power when reactant gas is supplied. The fuel cell system has reactant gas supply means for supplying reactant gas to the fuel cell, reactant gas recirculating means for enabling exhaust gas discharged from the fuel cell to be recirculated and combined with reactant gas flowing to the fuel cell, pump means for recirculating exhaust gas in the reactant gas recirculating means, pump-tempering means for increasing the temperature of the pump means, and control means for controlling the pump-tempering means. After the control means receives a fuel cell system stop signal, the control means controls the pump-tempering means such that the temperature of the pump means becomes higher than the temperature of piping of the reactant gas recirculating means.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 4 is a conceptual diagram showing the manner in which a process according to an embodiment of the invention prevents freezing of condensed water vapor in the reactant gas recirculation pump.

DESCRIPTION OF THE PREFERRED EMBODIMENTS

Embodiments of the present invention will be described in detail below with reference to the accompanying drawings.

First Embodiment

Figure 1:
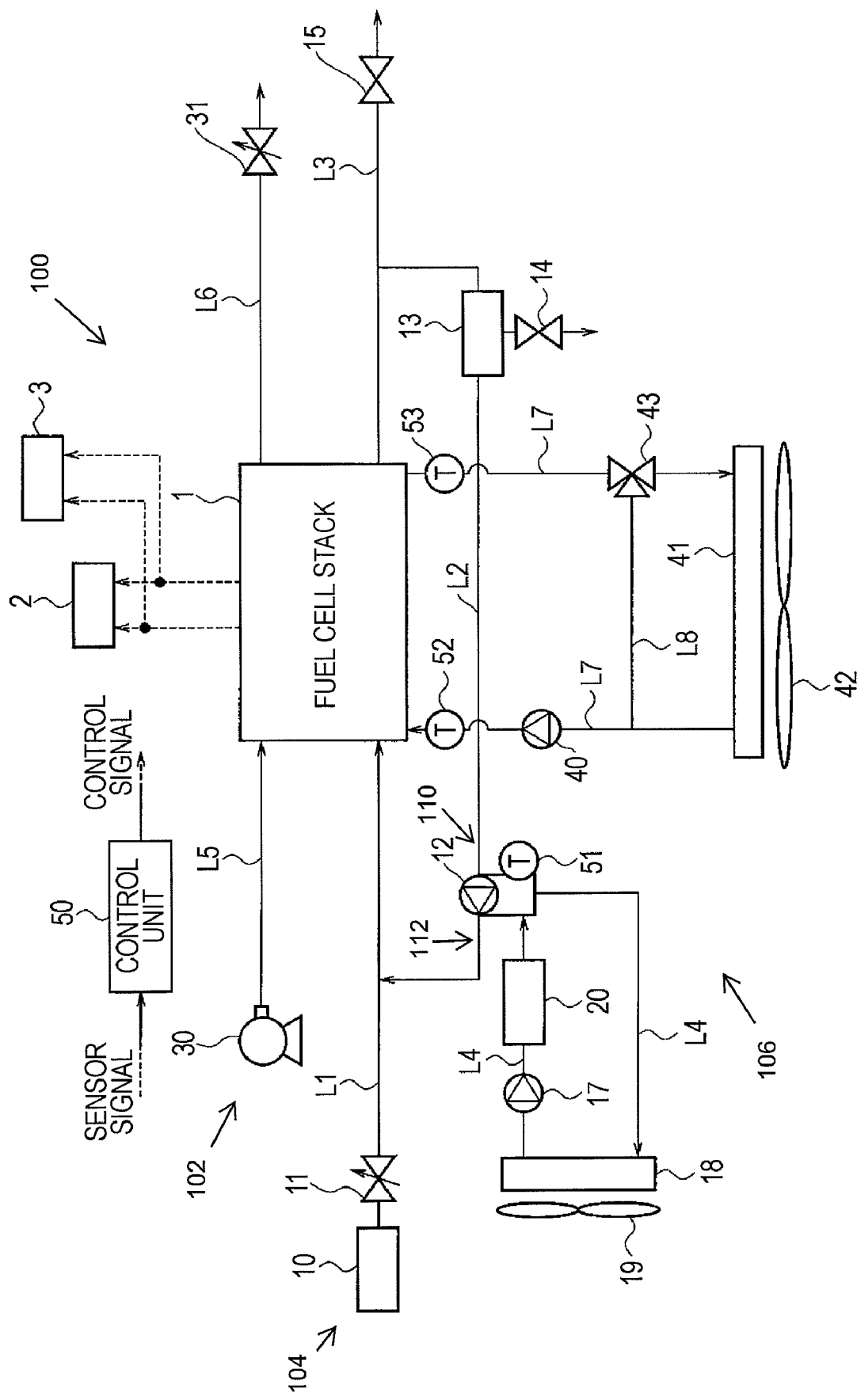
FIG. 1 is a block diagram showing a general configuration of a fuel cell system according to a first embodiment of the invention.

FIG. 1 is a block diagram showing a general configuration of a fuel cell system 100 according to a first embodiment of the present invention. For example, the fuel cell system 100 is mounted on a vehicle which is a movable body. The vehicle is driven by electrical power supplied from the fuel cell system.

The fuel cell system 100 includes a fuel cell stack 1 (fuel cell) having a plurality of stacked fuel cell structures and separators interposed between the fuel cell structures to hold the fuel cell structures. Each fuel cell structure includes a fuel electrode, an oxidizer electrode, and a solid polymer electrolyte membrane interposed between the fuel electrode and the oxidizer electrode. In the fuel cell stack 1, reactant gas (i.e., fuel gas) is supplied to each fuel electrode, and oxidizing gas is supplied to each oxidizer electrode. The reactant gas and oxidizing gas are electrochemically reacted to produce power. As described herein, hydrogen is used as the fuel gas and air is used as the oxidizing gas.

The fuel cell system includes a reactant gas system (hydrogen system) 104 which supplies hydrogen to the fuel cell stack 1, an air system 102 which supplies air to the fuel cell stack 1, and a cooling system 106 which cools the fuel cell stack 1.

In the hydrogen system 104, the hydrogen serving as the fuel gas is stored in a fuel tank (reactant gas supply unit) 10 such as a high-pressure hydrogen cylinder, and the hydrogen is supplied to the fuel cell stack 1 from the fuel tank 10 through a hydrogen supply path (reactant gas supply path) L1. In particular, a fuel tank master valve (not shown) is provided downstream of the fuel tank 10. When the fuel tank master valve is open, the pressure of the high-pressure hydrogen gas from the fuel tank 10 is mechanically reduced to a predetermined pressure by a reducing valve (not shown) provided downstream of the fuel tank master valve. The pressure of the pressure-reduced hydrogen gas is regulated to be a desired pressure by a hydrogen pressure regulator 11 provided downstream of the reducing valve, and then is supplied to the fuel cell stack 1.

Exhaust gas containing unused hydrogen gas discharged from each fuel electrode is discharged from the fuel cell stack 1 to a hydrogen recirculation path (reactant gas recirculation path) L2. A second end of the hydrogen recirculation path L2 is connected to the hydrogen supply path L1 located downstream of the hydrogen pressure regulator 11. The hydrogen recirculation path L2 has a recirculation unit, which is, for example, a hydrogen recirculation pump (reactant gas recirculation pump unit) 12. The hydrogen recirculation pump 12 is preferably a rotationally driven pump. By driving the hydrogen recirculation pump 12, exhaust gas discharged from the fuel cell stack 1 and flowing through the hydrogen recirculation path L2 is combined with the reactant gas supplied from the fuel tank 10 and flowing through the hydrogen supply path L1, and then the mixture of reactant gas and recirculated exhaust gas is supplied to each fuel electrode of the fuel cell stack 1.

Also, in the hydrogen recirculation path L2, an upstream piping portion 110 and a downstream piping portion 112 with reference to the hydrogen recirculation pump 12 have a reduced piping wall thickness. As a result, the temperatures of these piping portions decrease relative to the outside air more quickly than the temperature of the hydrogen recirculation pump 12 does when the system 100 is operating in a low-temperature environment. The region of reduced piping wall thickness, both upstream and downstream of the pipe, is preferably set to be as long as possible.

In the fuel cell stack 1, water is produced as a result of the reaction of hydrogen and oxygen in the fuel cell. The water is mostly produced at the oxidizer electrode. However, the produced water moves to the fuel electrode through the electrolyte membrane. Hence, the produced water flows into the hydrogen recirculation path L2, and may cause problems in the hydrogen recirculation pump 12, or in another portion of the hydrogen recirculation path L2. In addition, if the produced water flows into the fuel cell stack 1, the produced water may cause flooding, reducing the reaction area of the fuel electrode. Accordingly, a gas-liquid separator 13 is provided upstream of the hydrogen recirculation pump 12. The gas-liquid separator 13 separates recirculation gas (exhaust gas from the fuel electrode of the fuel cell stack 1) into fuel gas to be recirculated and water to be discharged. A discharge path is connected to the gas-liquid separator 13. The discharge path has a discharge valve 14. When the discharge valve 14 is open, the produced water held in the gas-liquid separator 13 can be discharged.

Meanwhile, in the case in which air is used as the oxidizing gas, impurities in the air can be transmitted from the oxidizer electrode to the fuel electrode. Hence, the quantity of impurities tends to increase in the fuel electrode and the recirculation system (including in the hydrogen recirculation path L2), and the partial pressure of the hydrogen tends to decrease. The impurities may be non-fuel gas components, i.e., components other than the hydrogen as the fuel gas. For example, the majority of the impurities may be nitrogen. If the quantity of impurities becomes excessive, the output from the fuel cell stack 1 may decrease. Therefore, the quantity of impurities in the circulation system has to be controlled. Accordingly, a purge path L3 is provided in the hydrogen recirculation path L2. The purge path L3 discharges the recirculation gas to the outside. The purge path L3 has a purge valve 15. By adjusting the valve opening and the open time of the purge valve 15, the quantity of impurities to be discharged to the outside through the purge path L3 can be adjusted. In this manner, the quantity of impurities present in the fuel electrode and the hydrogen recirculation path L2 is controlled so as to maintain power generation performance.

Also, in this embodiment, a pump-cooling path L4 provides for a flow of coolant to the hydrogen recirculation pump 12. The pump-cooling path L4 cools the hydrogen recirculation pump 12. The pump-cooling path L4 is a closed-loop path through which the coolant (for example, cooling water) is circulated. The coolant is supplied to the hydrogen recirculation pump 12 through the pump-cooling path L4. The pump-cooling path L4 has a pump-cooling circulation pump 17 which causes the cooling water to be circulated. By operating the circulation pump 17, the cooling water in the pump-cooling path L4 is circulated. The pump-cooling path L4 has a radiator (pump-cooling unit) 18. The radiator 18 has a fan 19 which blows air to the radiator 18 to accelerate cooling of the coolant flowing through the radiator 18. The cooling water, the temperature of which has been increased as a result of cooling the hydrogen recirculation pump 12, flows through the pump-cooling path L4 to the radiator 18, and is cooled by the radiator 18. The cooled cooling water is supplied to the hydrogen recirculation pump 12. The temperature of the cooling water in the pump-cooling path L4 can be adjusted by controlling the rotational speed of the fan 19 and the rotational speed of the pump-cooling circulation pump 17. In addition, the pump-cooling path L4 has a heater (coolant heating unit) 20, which is provided between the pump-cooling circulation pump 17 and the hydrogen recirculation pump 12. The heater 20 serves as a pump-tempering apparatus. The heater 20 heats the cooling water flowing through the pump-cooling path L4. Accordingly, the hydrogen recirculation pump 12 can be heated by using the cooling water.

In this embodiment, through not particularly shown, the pump-cooling path L4 is also used for cooling other auxiliaries of the system. Thus, the preset temperature of the cooling water flowing through the pump-cooling path L4 is set with regard to the control temperature of the hydrogen recirculation pump 12 and the control temperatures of other auxiliaries. For example, the preset temperature of the cooling water can be set at 50° C. This preset temperature is relatively lower than the preset temperature of coolant in the cooling system of the fuel cell stack 1, which will be described later.

In the air system 102, for example, air serving as the oxidizing gas is acquired and compressed by a compressor 30, and the compressed air is supplied to the fuel cell stack 1 through an air supply path L5. Gas discharged from the oxidizer electrode (the air after at least some of its oxygen has been consumed) is discharged to the outside through an air discharge path L6. The air discharge path L6 has an air pressure regulator 31 which regulates the pressure of the air to be supplied to the fuel cell stack 1.

The cooling system has a closed-loop stack-cooling path (fuel-cell-cooling path) L7 through which coolant (cooling water) for cooling the fuel cell stack 1 is circulated. The stack-cooling path L7 has a stack-cooling circulation pump 40 which causes the cooling water to be circulated. By operating the circulation pump 40, the cooling water in the stack-cooling path L7 is circulated. The stack-cooling path L7 has a radiator (fuel-cell-cooling unit) 41. The radiator 41 has a fan 42 which blows the air to the radiator 41. The cooling water, the temperature of which has been increased as a result of cooling the fuel cell stack 1, flows through the stack-cooling path L7 to the radiator 41, and is cooled by the radiator 41. The cooled cooling water is supplied to the fuel cell stack 1. The stack-cooling path L7 is split into small paths in the fuel cell stack 1, and hence, the inside of the fuel cell stack 1 is entirely cooled.

The stack-cooling path L7 has a bypass path L8 which causes the cooling water discharged from the fuel cell stack 1 to be circulated bypassing the radiator 41 and returning to the fuel cell stack 1. A three-way valve 43 is provided at a branch point at which the bypass path L8 is split from the stack-cooling path L7. The three-way valve 43 adjusts distribution of the flow rate of the cooling water between the bypass path L8 and the stack-cooling radiator 41. The temperature of the cooling water in the stack-cooling path L7 can be adjusted by controlling the rotational speed of the stack-cooling circulation pump 40, the rotational speed of the fan 42, and the valve opening of the three-way valve 43. A preset temperature of the cooling water in the stack-cooling path L7 is set, for example, in a range of from about 60° C. to about 90° C., and can be adjusted based on the power generation characteristic and other operating characteristics of the fuel cell stack 1.

A power acquisition device (not shown) is connected to the fuel cell stack 1. The power acquisition device acquires electric current from the fuel cell stack 1, so that the power generated by the fuel cell stack 1 is supplied to an electric motor 2 and other components which drive the vehicle. Also, a battery 3 is connected to the power acquisition device in a manner parallel to the electric motor 2. First, the battery 3 supplies power required for driving various auxiliaries (for example, the hydrogen recirculation pump 12 and the compressor 30) which must operate for the fuel cell stack 1 to generate power. Second, when the power generated by the fuel cell stack 1 is insufficient to supply the power required for the system (required power), the battery 3 supplies power to the electric motor 2 to make up for the shortfall. Third, when the power generated by the fuel cell stack 1 exceeds the required power, the battery 3 stores the excess power, and also stores regenerated power from the electric motor 2 when the electric motor 2 is operated regeneratively.

A control unit (controller) 50 integrally controls the fuel cell system 100. The control unit 50 is operated under a control program so as to control the operation of the system. The control unit 50 may be a microcomputer comprising a CPU, a ROM, a RAM, and an I/O interface. The control unit 50 performs various calculations based on the operating conditions of the system, and outputs the results of the calculations as control signals to various actuators (not shown), so as to control various elements such as the hydrogen pressure regulator 11, the hydrogen recirculation pump 12, the purge valve 15, the pump-cooling circulation pump 17, the heater 20, the compressor 30, the air pressure regulator 31, the stack-cooling circulation pump 40, and the three-way valve 43.

The control unit 50 receives sensor signals from various sensors to detect the condition of the system. A pump temperature sensor 51 detects the temperature of the hydrogen recirculation pump 12. A stack inlet temperature sensor 52 detects the stack inlet temperature, i.e., the temperature of the cooling water for stack-cooling which flows into the fuel cell stack 1. A stack outlet temperature sensor 53 detects the stack outlet temperature, i.e., the temperature of the cooling water for stack-cooling which flows from the fuel cell stack 1. The stack inlet temperature and the stack outlet temperature correspond to the temperature of the fuel cell stack 1 (temperature of the circulation gas).

Note that the temperature of the recirculation gas can be correlated with the temperature of the fuel cell, because the recirculation gas is gas exhausted from the fuel cell after the exothermic electrochemical reaction has occurred. Therefore, as the fuel cell becomes hotter, so does the recirculation gas, and as the fuel cell becomes cooler, so does the recirculation gas. In other words, the stack inlet temperature sensor 52 and the stack outlet temperature sensor 53 which detect the stack inlet and stack out temperatures, respectively, can function as a fuel cell temperature detector for detecting the temperature of the fuel cell stack 1 (temperature of the circulation gas). While the stack inlet temperature sensor 52 and the stack outlet temperature sensor 53 can each function as a fuel cell temperature detector, the stack inlet temperature sensor 52 is preferably used when the position of a portion of the hydrogen recirculation path L2 near the outlet of the fuel cell stack 1 corresponds to the position of a portion of the stack-cooling path L7 near the inlet of the fuel cell stack 1 (i.e., a counter-flow cooling configuration). Otherwise, the stack outlet temperature sensor 53 is preferably used when the position of the portion of the hydrogen recirculation path L2 near the outlet of the fuel cell stack 1 corresponds to the position of a portion of the stack-cooling path L7 near the outlet of the fuel cell stack 1 (i.e., a parallel flow cooling configuration).

In the first embodiment, the control unit 50 performs heating control in which the temperature of the hydrogen recirculation pump 12 is increased such that the temperature of the hydrogen recirculation pump 12 becomes higher than a piping temperature of the hydrogen recirculation path L2 during a stop process of the fuel cell system 100. Also, the control unit 50 performs rotational control of the rotationally driven hydrogen recirculation pump 12 during the stop process of the system 100.

Accordingly, the pump unit 12, which causes the reactant gas to be recirculated, can be effectively prevented from being frozen, while minimal power is wasted after the system is stopped (power generation stop).

Antifreezing control of the hydrogen recirculation pump 12 during the stop process of the system 100 is described below. The antifreezing control is included in a control method of the fuel cell system 100 according to this embodiment. In a low-temperature environment after the system is stopped (i.e., during standing), water vapor in the hydrogen recirculation path L2 can condense and adhere to surfaces of a movable part in the hydrogen recirculation pump 12, resulting in the movable part, and other parts of the hydrogen recirculation path 12, becoming frozen and immovable. The antifreezing control prevents the movable part and other parts of the hydrogen recirculation path 12 from being frozen. The antifreezing control includes heating control of the hydrogen recirculation pump 12 and rotational control of the hydrogen recirculation pump 12.

When the fuel cell system 100 is stopped, if reactant gas remains in the fuel cell stack 1 even after the supply of the fuel gas (reactant gas) and the oxidizing gas is stopped, power can still be generated by using the remaining gas. Thus, the chemical reaction in the fuel cell may progress. As a result, for example, a membrane electrode assembly (MEA) included in the fuel cell may be damaged. The MEA can be protected by connecting an electric load to the fuel cell system 100 after the supply of the reactant gas has been stopped, so as to consume the power generated by using the remaining gas in the fuel cell. In the present embodiment, the power generated by using the remaining gas is put to effective use for antifreezing control, rather than merely being dissipated to an electric load. Accordingly, the production of condensed water is further reliably avoided at the recirculating pump unit 12, and thus freezing can be prevented, while at the same time minimizing the waste of power after the system 100 has been stopped.

Figure 2:
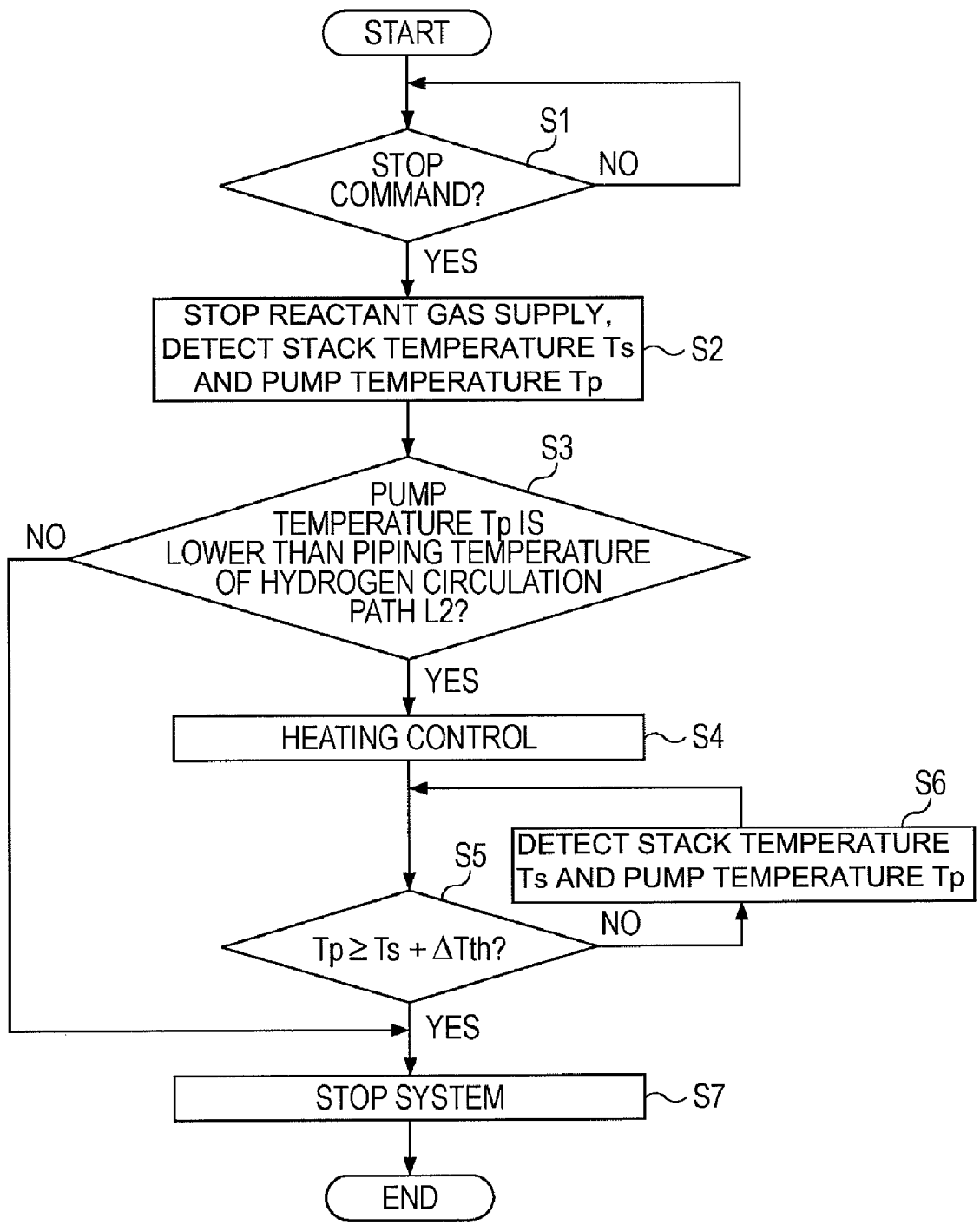
FIG. 2 is a flowchart showing a procedure of heating control of a hydrogen recirculation pump according to the embodiment of FIG. 1.

FIG. 2 is a flowchart showing a stop process of the hydrogen recirculation pump 12 according to the first embodiment of the present invention, the stop process including heating control. Heating control of the hydrogen recirculation pump 12 during the stop process prevents the condensed water from being collecting in the hydrogen recirculation pump 12 after the fuel cell system 100 is stopped. The control unit 50 performs the processes shown in the flowchart.

In step S1, the control unit 50 determines whether or not a fuel cell system stop signal is input. For example, it is determined whether or not a stop command of the system is input to the control unit 50 by turning an ignition switch OFF. If a stop command is input (YES in step S1), or when the stop command of the system is acquired, the procedure goes to step S2 and subsequent steps corresponding to the stop process of the system. If NO in step S1, or when the stop command of the system is not acquired, the process in step S1 is performed again after a predetermined time elapses.

In step S2, the supply of the reactant gas is stopped, and a stack temperature Ts and a pump temperature Tp are detected. The stack temperature Ts is the temperature of the fuel cell stack 1, and is detected from the stack inlet temperature sensor 52 or the stack outlet temperature sensor 53, depending on the configuration of the system. The pump temperature Tp is the temperature of the hydrogen recirculation pump 12, and is detected from the pump temperature sensor 51.

In step S3, the control unit 50 determines whether or not the pump temperature Tp is lower than the piping temperature of the hydrogen recirculation path L2, so as to determine whether or not heating control is to be performed. In this embodiment, the controller 40 determines whether or not the pump temperature Tp is lower than the piping temperature of the hydrogen recirculation path L2 based on determination whether or not the pump temperature Tp is lower than a control start temperature Tst. The control start temperature Tst is a temperature for determining whether or not the below-described heating control is to be performed. The control start temperature Tst is preset as an optimum value based on experiment or a simulation. For example, the control start temperature Tst can be set at about 60° C. In particular, the control start temperature Tst is experimentally obtained as a value for determining whether or not the pump temperature Tp is at a temperature lower than the temperature of the hydrogen recirculation path L2 after operation of the system 100 is stopped, so as to perform heating control when the pump temperature Tp is lower than the piping temperature of the hydrogen recirculation path L2.

Alternatively, the pump temperature Tp and the piping temperature of the hydrogen recirculation path L2 may be directly measured and compared with each other, so as to determine whether or not the pump temperature Tp is lower than the piping temperature of the hydrogen recirculation path L2. Still alternatively, instead of the piping temperature of the hydrogen recirculation path L2, since the piping temperature of the hydrogen recirculation path L2 is correlative with the gas temperature of the gas discharged from the fuel cell stack 1 and circulated, the fuel cell stack temperature Ts, or a fuel cell stack cooling water outlet temperature, which is assumed to correspond to the fuel cell stack temperature, may be compared with the pump temperature Tp and used for the determination.

If the pump temperature Tp is lower than the piping temperature of the hydrogen circulation path L2 (YES in step S3), or when the pump temperature Tp is lower than the control start temperature Tst (Tp<Tst), the process proceeds to step S4. If NO in step S3, or when the pump temperature Tp is equal to or higher than the control start temperature Tst (Tp≧Tst), the process proceeds to step S7.

In step S4, heating control for heating the hydrogen recirculation pump 12 is performed. In particular, the control unit 50 switches the heater 20 provided in the pump-cooling path L4 to ON from OFF, so as to heat the hydrogen recirculation pump 12 by increasing temperature of the cooling water in the pump-cooling path L4. The control unit 50 may additionally perform the following control steps as heating control, so as to efficiently increase the temperature of the cooling water. First, the rotational speed of the pump-cooling circulation pump 17 is decreased, and the flow rate of the cooling water is decreased, thereby increasing the rate of temperature increase of the cooling water by the heater 20. Second, the fan 19 is stopped, thereby decreasing rate of the dissipation of heat by the radiator 18.

In step S5, the control unit 50 determines whether or not the pump temperature Tp is equal to or higher than a control end temperature. The control end temperature is the sum of the stack temperature Ts and the determination temperature ΔTth (i.e., Ts+ΔTth). The control end temperature is a temperature to determine whether or not the pump temperature Tp is higher than the stack temperature Ts by a predetermined value or larger. Thus, the determination temperature ΔTth is preset as an optimum value through an experiment or a simulation. For example, the determination temperature ΔTth can be set at about 10° C.

If YES in step S5, or when the pump temperature Tp is equal to or higher than the control end temperature (Tp≧Ts+ΔTth), the process proceeds to step S7. If NO in step S5, or when the pump temperature Tp is lower than the control end temperature (Tp<Ts+ΔTth), the stack temperature Ts and the pump temperature Tp are detected in step S6, and the process recycles back to perform step S5 again.

In step S7, the fuel cell system 100 is stopped. In particular, the heater 20 in the pump-cooling path L4 is turned OFF and the hydrogen recirculation pump 12 is turned OFF.

Next, rotational control of the hydrogen recirculation pump 12 is described. During normal operation of the system, liquid water discharged from the fuel cell stack 1 or liquid water resulting from condensed vapor adheres onto the inside of the hydrogen recirculation pump 12. Thus, as the hydrogen recirculation pump 12 is rotated, the condensed water adhering to the hydrogen recirculation pump 12 is discharged into the hydrogen recirculation path L2. Rotational control of the hydrogen recirculation pump 12 is performed such that the control unit 50 controls the rotational speed of the hydrogen recirculation pump 12.

When the fuel cell system stop signal is input, power must be supplied to the heater 20, the pump-cooling circulation pump 17, and other components of the system 100, during heating control of the hydrogen recirculation pump 12. At this time, the power stored in the battery 3 may be used. However, some power in the battery 3 must be conserved for the next start of the system 100. Thus, power generated by the fuel cell stack 1 is preferably used as much as possible. When power is generated by the fuel cell stack 1, it is necessary to drive the hydrogen recirculation pump 12 to supply the hydrogen to the fuel cell stack 1. But when a stop signal is input, the rotational speed of the hydrogen recirculation pump 12 is preferably set to a value higher than that during the normal power generation, so as to discharge from the hydrogen recirculation pump 12 the condensed water that adhered during the normal power generation.

However, as the rotational speed of the hydrogen recirculation pump 12 increases, so does the power consumption of the pump 12. As a result, the heat generated by the pumping operation of the hydrogen recirculation pump 12 itself also increases. In this case, it is necessary to interrupt the heating control in order to prevent damage to or breakage of the hydrogen recirculation pump 12 due to overheating if the cooling water in the pump-cooling path is not able to sufficiently cool the hydrogen recirculating pump 12.

Figure 3:
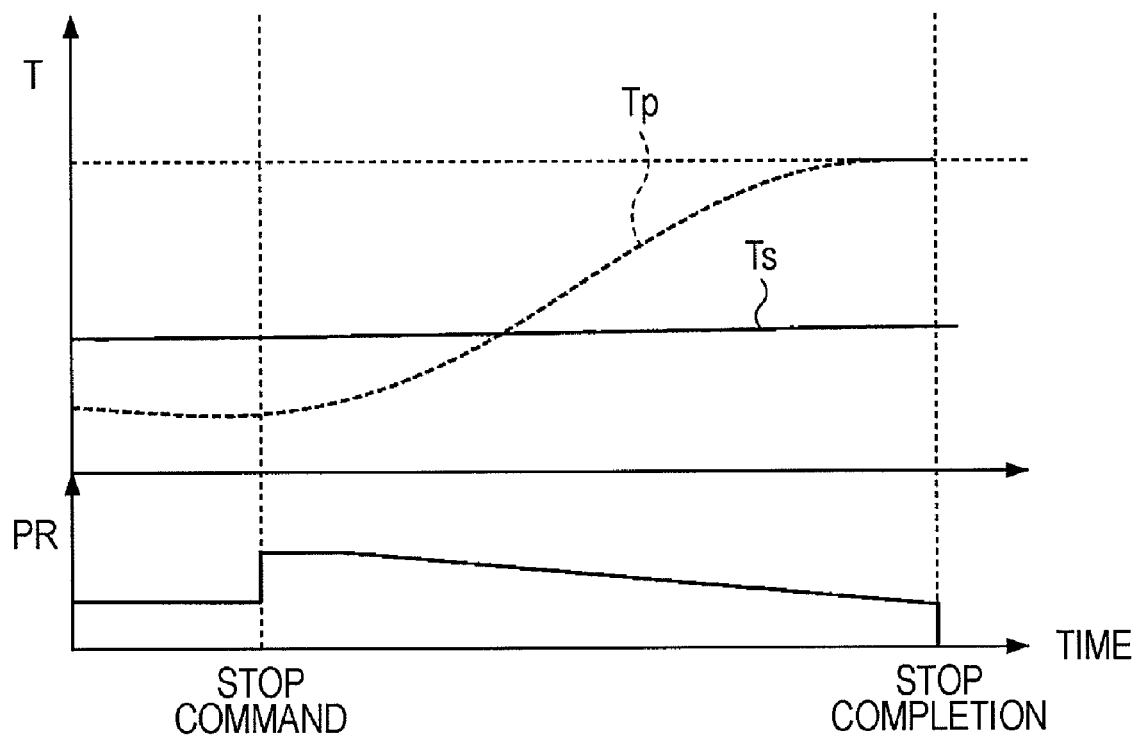
FIG. 3 is an explanatory diagram showing the relationship between the rotational speed and the temperature of the reactant gas recirculation pump during rotational control of the reactant gas recirculation pump.

FIG. 3 is an explanatory diagram showing the relationship between the rotational speed PR and the temperature Tp of the hydrogen recirculation pump 12 during rotational control of the hydrogen recirculation pump 12. In this embodiment, in an initial phase of the heating control of the hydrogen recirculation pump 12 performed during the stop process, the hydrogen recirculation pump 12 is controlled such that the rotational speed of the hydrogen recirculation pump 12 is set to a higher value than that during normal power generation. Then, the hydrogen recirculation pump 12 is controlled by decreasing the rotational speed of the hydrogen recirculation pump 12, for example in a linear manner, as the temperature of the hydrogen recirculation pump 12 increases. With this control, the pump temperature Tp of the hydrogen recirculation pump 12 is prevented from increasing to such a temperature as to exceed a temperature at which the performance of the hydrogen recirculation pump 12 degrades, or at which the pump 12 ceases to function properly. Accordingly, as shown in FIG. 3, the temperature of the hydrogen recirculation pump 12 can increase gradually.

Now, the concept of antifreezing control according to this embodiment is described. FIG. 4 is a conceptual diagram showing the antifreezing control of the hydrogen recirculation pump 12 of this embodiment. In FIG. 4, region A designates an atmosphere adjacent to the hydrogen recirculation pump 12, region B designates an atmosphere near the piping portion of the hydrogen recirculation path L2 and near the hydrogen recirculation pump 12, and a region C designates an atmosphere inside the hydrogen recirculation path L2.

Immediately after the fuel cell system stop signal is input, if the temperature of the hydrogen recirculation pump 12 is lower than the temperatures of the piping portions 110, 112 in the hydrogen recirculation path L2 located upstream and downstream of the hydrogen recirculation pump 12, a temperature relationship between the regions develops such that $T_C > T_B > T_A$, where $T_C$ is the temperature of region C, $T_B$ is the temperature of region B, and $T_A$ is the temperature of region A.

The relative humidity of the circulation gas in the hydrogen recirculation path L2 is maintained at 100% during normal power generation, or during standing after the fuel cell system is stopped (i.e., after power generation is stopped). Thus, the temperature of the recirculation gas corresponds to the dew point (i.e., the condensation temperature of the water vapor in the recirculation gas), and in regions A and B with the temperatures lower than the dew point, condensation is started. When the vapor in region A is condensed, the vapor pressure of water in region A decreases. Hence, to keep the balance of the water vapor pressure, the water vapor in region C flows to region A, and that water vapor is then cooled and condensed. This cycle continues. Similarly, condensation occurs in region B. The condensation rate of the water vapor is substantially proportional to the difference between the temperature of the recirculation gas and the temperature of region A (or the temperature of region B). Thus, when the temperature of the hydrogen recirculation pump 12 is lower than the piping temperature of the hydrogen recirculation path L2, the condensed water preferentially adheres to the hydrogen recirculation pump 12.

Figure 5A:
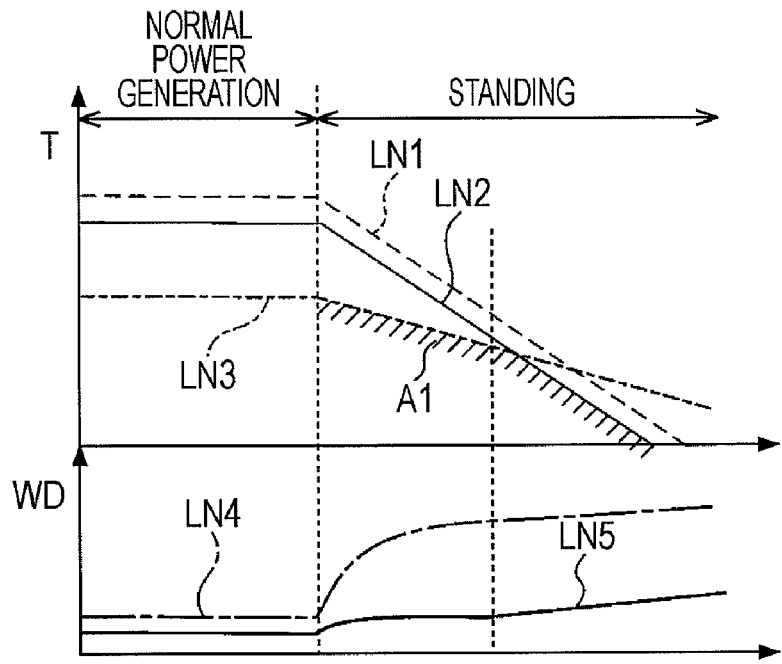
FIGS. 5A and 5B are explanatory diagrams each showing the relationship between the temperature and the adhering quantity of condensed water during the period from a normal operation to standing.
Figure 5B:
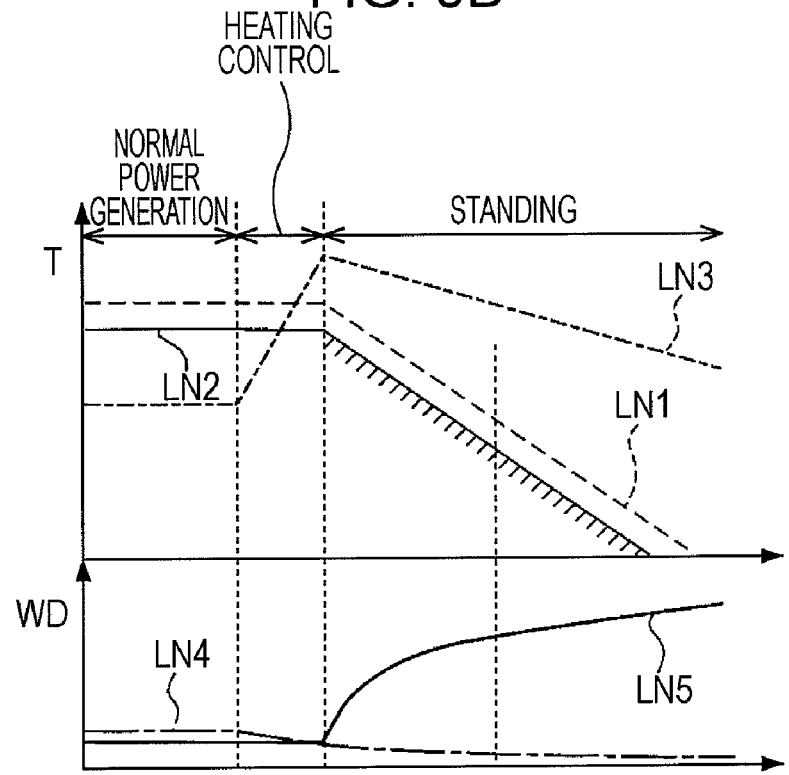

FIGS. 5A and 5B are explanatory diagrams each showing the relationship between temperature T and an adhering quantity WD of condensed water during a period from normal operation to standing after the power generation is stopped. FIG. 5A depicts a relationship diagram when the antifreezing control is not performed, and FIG. 5B depicts a relationship diagram when the antifreezing control is performed. Reference character LN1 denotes the temperature of the circulation gas, LN2 denotes the temperature of the piping of the hydrogen recirculation path L2, LN3 denotes the temperature of the hydrogen recirculation pump 12, LN4 denotes the quantity of condensed water adhering to the hydrogen recirculation pump 12, and LN5 denotes the quantity of condensed water adhering to the piping of the hydrogen recirculation path L2.

First, as shown in FIG. 5A, although the condensed water is generated during normal operation, since the hydrogen recirculation pump 12 is rotating during normal operation causing recirculation in the hydrogen recirculation path L2, the quantity of condensed water tends to be small. In contrast, during standing, after the power generation of the fuel cell system is stopped, condensation continues and the condensed water tends to be generated and accumulate more in a low-temperature portion of the hydrogen recirculation path L2, such as in the hydrogen recirculation pump 12. In FIG. 5A, the hatched area with oblique lines represents an area in which condensed water is likely generated. The quantity of water vapor available to be condensed increases in a high-temperature portion of the system. Hence, an increase in the quantity of condensed water is accelerated immediately after the stop, while the fuel cell 1 is still hot but the hydrogen recirculation path L2 and the hydrogen recirculation pump 12 are rapidly cooling. As a result, the condensed water tends to adhere to the hydrogen recirculation pump 12.

In contrast, as shown in FIG. 5B, the method of operation in the present embodiment substantially solves this problem and prevents condensed water from adhering to and collecting in the hydrogen circulation pump 12. In particular, when the fuel cell system 100 is stopped, the control unit 50 performs heating control in which the temperature of the hydrogen recirculation pump 12 is increased such that the temperature of the hydrogen recirculation pump 12 becomes higher than the piping temperature of the hydrogen recirculation path L2 in the vicinity (upstream and downstream) of the hydrogen recirculation pump 12. Since the temperature of the hydrogen recirculation pump 12 becomes higher than the piping temperature of the hydrogen recirculation path L2, as shown in FIG. 5B, condensed water is generated more in the piping of the hydrogen recirculation path L2 than in the hydrogen recirculation pump 12 during the standing after the system is stopped, since the piping reaches a lower temperature more quickly than the pump 12. In FIG. 5B, the hatched area with oblique lines represents an area in which condensed water is likely generated. Accordingly, the condensed water can be prevented from adhering to the hydrogen recirculation pump 12. Thus, the hydrogen recirculation pump 12 can be prevented from being frozen, and it is not necessary to heat the hydrogen recirculation pump 12, for example using energy from the battery 3, while the system is stopped.

Also, in this embodiment, during normal operation of the system 100, the preset temperature of the cooling water for cooling the hydrogen recirculation pump 12 is set lower than the preset temperature of the cooling water for cooling the fuel cell stack 1, since the fuel cell stack 1 runs more efficiently at a higher temperature than the pump 12. With this configuration, when the system 100 is stopped, the temperature of the hydrogen recirculation pump 12 rapidly becomes lower than the temperature of the piping of the hydrogen recirculation path L2. Thus, the condensed water may adhere more readily to the hydrogen recirculation pump 12. However, by performing heating control of the hydrogen recirculation pump 12 as disclosed in the present embodiment, condensed water can be prevented from adhering to the hydrogen recirculation pump 12.

Further, in this embodiment, the heater 20 heats the cooling water which flows from the radiator 18 (which is used for cooling the cooling water going to the hydrogen recirculation pump 12) to the hydrogen recirculation pump 12, thereby heating the hydrogen recirculation pump 12 by using the heated cooling water. With this configuration, since the heater 20 is located downstream of the radiator 18, a heat-retaining property of the hydrogen recirculation pump 12 can be enhanced (i.e., the heat provided to and retained in the pump 12 can be increased). Thus, the piping of the hydrogen recirculation path L2 can be easily cooled faster than the hydrogen recirculation pump 12, such that condensed water can be further reliably prevented from adhering to the hydrogen recirculation pump 12.

Also, in this embodiment, the control unit 50 performs the heating control of the hydrogen recirculation pump 12 until the temperature difference between the hydrogen recirculation pump 12 and the fuel cell stack 1 increases to become equal to or higher than the determination temperature $\Delta T_{th}$, which is preset. With this configuration, the temperature of the hydrogen recirculation pump 12 can be increased to a temperature higher than the temperature of the fuel cell stack 1 (the temperature of the circulation gas) by the preset determination temperature $\Delta T_{th}$. In this manner, the heat-retaining property of the hydrogen recirculation pump 12 can be enhanced. Thus, the piping of the hydrogen recirculation path L2 can be cooled more quickly than the hydrogen recirculation pump 12, thus reliably preventing condensed water from adhering to the hydrogen recirculation pump 12. Also, since the temperature of the hydrogen recirculation pump 12 can be monitored, the hydrogen recirculation pump 12 can be prevented from being overheated and thus, for example, being broken. It is noted that, in this embodiment, while the pump temperature sensor 51 detects the temperature of the hydrogen recirculation pump 12 directly, the pump temperature sensor 51 may alternatively detect the temperature of the hydrogen recirculation pump 12 based on the temperature of the cooling water flowing through the pump-cooling path L4. With this configuration, a similar advantage can be attained.

In addition, to further prevent overheating of the hydrogen recirculation pump 12 when the system is stopped, the control unit 50 performs rotational control to control the hydrogen recirculation pump 12. It is understood that the hydrogen recirculation pump 12 is rotationally driven. The rotational speed of the pump 12 is decreased from the rotational speed during normal operation depending on the increase in temperature of the hydrogen recirculation pump 12, so as to reduce the heat being generated by the pump 12 itself. By continuing to rotationally drive the hydrogen recirculation pump 12, even at a lower speed, the condensed water adhering during the normal operation can be discharged. Also, the temperature of the coolant for the hydrogen recirculation pump 12 can be increased while the power consumption of the hydrogen recirculation pump 12 is reduced, to maintain heat-resistant property of the hydrogen recirculation pump 12. Thus, the heat-retaining property of the hydrogen recirculation pump 12 can be enhanced and the piping of the hydrogen recirculation path L2 is cooled faster than the hydrogen recirculation pump 12, while still preventing overheating of the pump 12. Note, however, that the rotational speed does not have to be decreased if it is not necessary to consider the overheating of the hydrogen recirculation pump 12.

Further, in this embodiment, the upstream piping portion 110 and the downstream piping portion 112 of the hydrogen recirculation path L2 connected to the hydrogen recirculation pump 12 are reduced in wall thickness. With this configuration, the temperatures of these piping portions decrease faster relative to the outside air faster than the temperature of the hydrogen recirculation pump 12. Accordingly, condensed water is promoted to adhere onto the inner surfaces of the piping portions of the hydrogen recirculation path L2, such that condensed water can be further reliably prevented from adhering to the hydrogen recirculation pump 12. However, when the condensed water adhering onto the inner surfaces of the piping portions is frozen, the flow path in the piping is restricted and the pressure loss of the flow path may slightly increase. In order to minimize the increase in pressure loss, the reduced-wall thickness area is preferably long because so that the ice forms a relatively thin layer on the inside of the reduced wall thickness piping. Also, although the water vapor in the hydrogen recirculation path L2 may be condensed and frozen in the reduced-wall thickness piping portions, considering the pressure loss in this case, the diameter the reduced-wall thickness piping portions may be increased to minimize the pressure loss.

Second Embodiment

Figure 6:
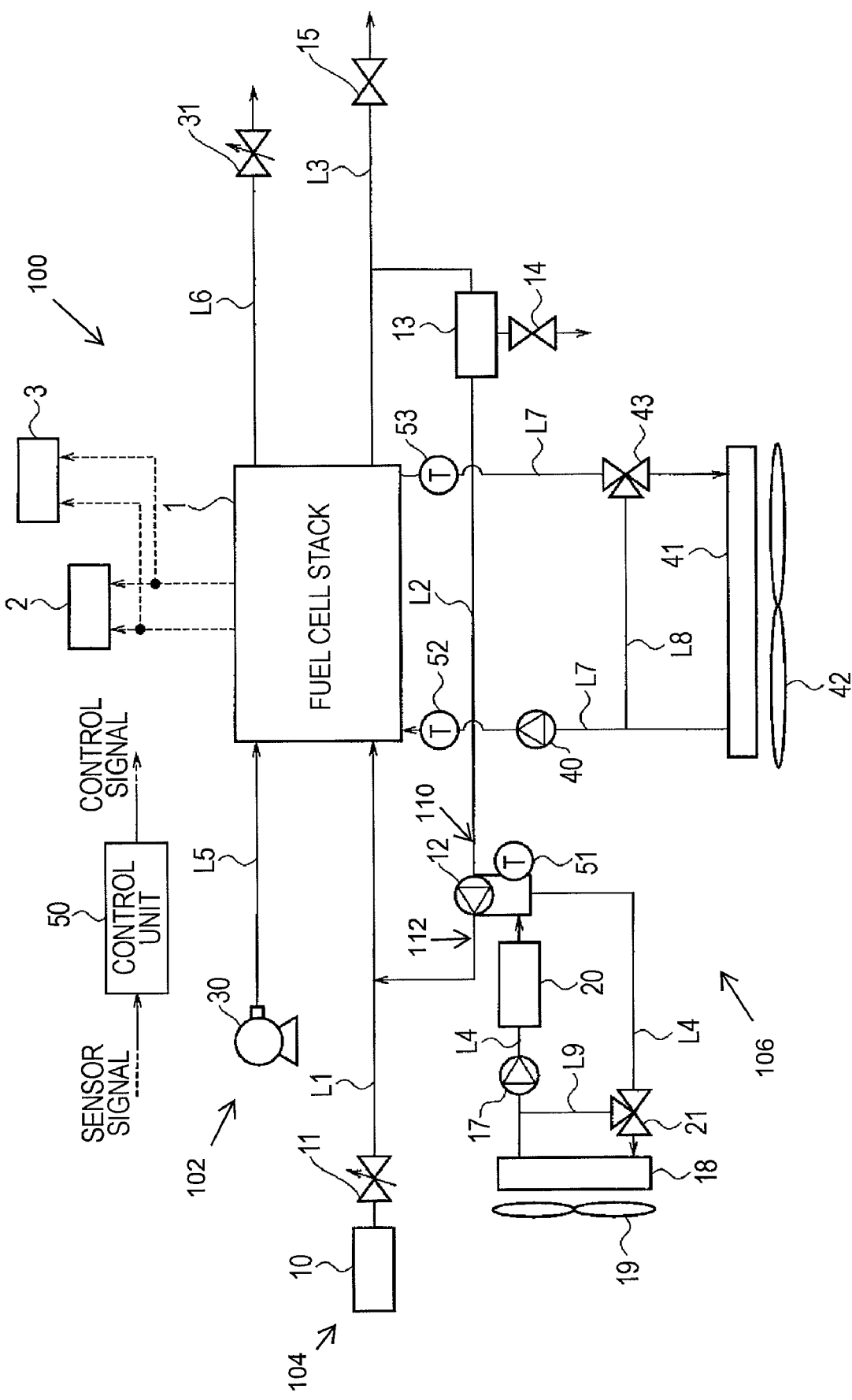
FIG. 6 is a block diagram showing a configuration of a fuel cell system according to a second embodiment of the invention.

FIG. 6 is a block diagram showing a configuration of a fuel cell system 100 according to a second embodiment. The fuel cell system 100 of the second embodiment is different from that of the first embodiment in the configuration of the cooling system 106 of the hydrogen recirculation pump 12.

In particular, the pump-cooling path L4 has a bypass path L9 in parallel to the radiator. A three-way valve (switch unit) 21 is provided at a branch point where the bypass path L9 is split from the pump-cooling path L4. As cooling water is circulated in the pump-cooling path L4 from the hydrogen recirculation pump 12, the three-way valve 21 can switch the flow between the bypass path L9 and the radiator 18, or can apportion part of the flow to the bypass path L9 and the remainder of the flow to the radiator 18. In this configuration, when heating control of the hydrogen recirculation pump 12 is performed, the control unit 50 controls the three-way valve 21, and changes the path of the cooling water from the radiator 18 to the bypass path L9.

With this configuration, the heat-retaining property of the hydrogen recirculation pump 12 can be enhanced. Thus, the piping of the hydrogen recirculation path L2 can be cooled faster than the hydrogen recirculation pump 12 and condensed water can be further reliably prevented from adhering to the hydrogen recirculation pump 12.

Third Embodiment

Figure 7:
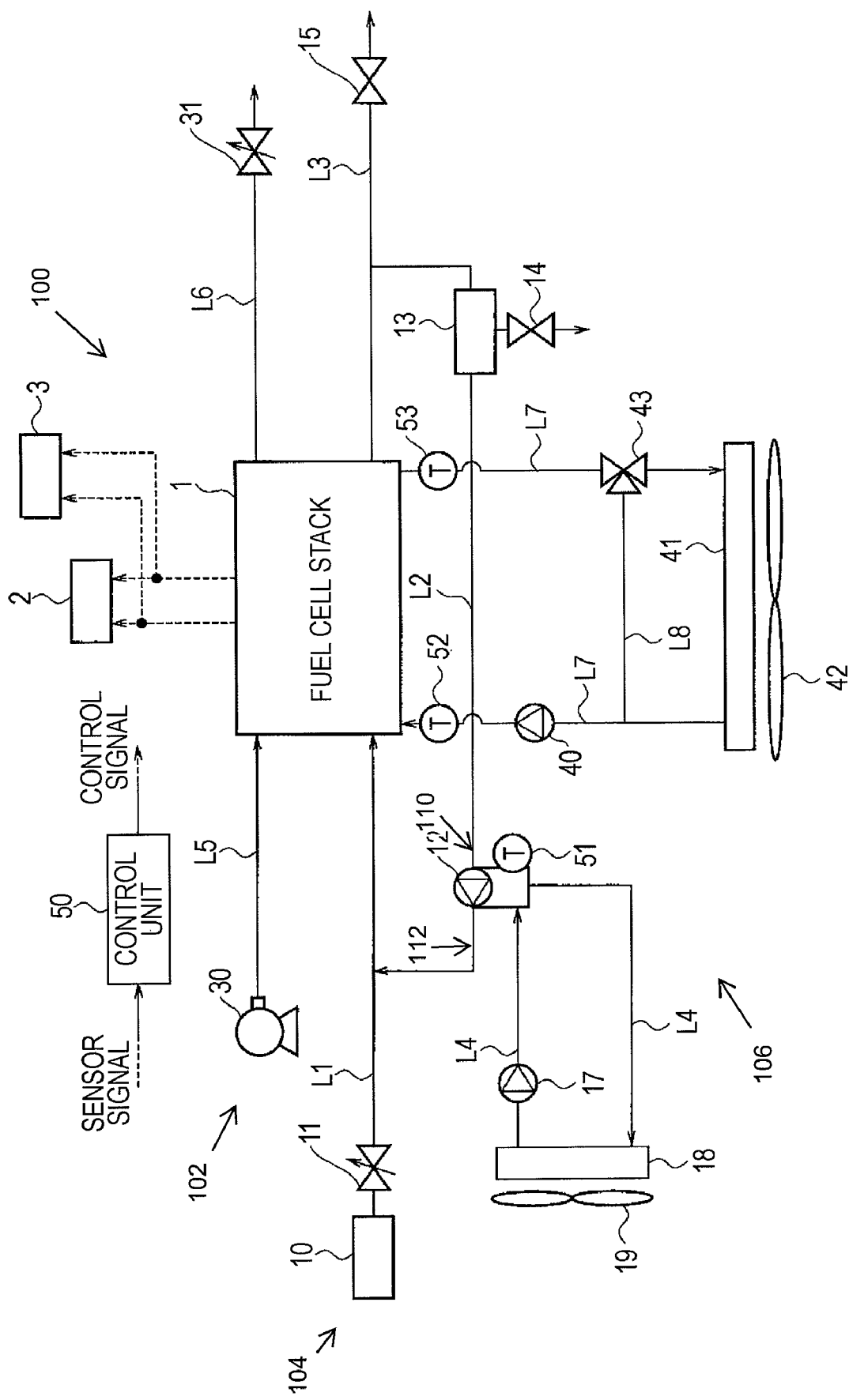
FIG. 7 is a block diagram showing a configuration of a fuel cell system according to a third embodiment of the invention.

FIG. 7 is a block diagram showing a configuration of a fuel cell system 100 according to a third embodiment. The fuel cell system 100 of the third embodiment is different from that of the first embodiment in the configuration of the cooling system of the hydrogen recirculation pump 12.

In particular, in this embodiment, the pump-cooling path L4 does not have the heater 20. Thus, to perform heating control of the hydrogen recirculation pump 12, heat generated by driving the hydrogen recirculation pump 12 is used. In particular, the hydrogen recirculation pump 12 in this embodiment also serves as its own pump-tempering apparatus, such that the heat generated by pumping the recirculation gas through the through the hydrogen recirculation path L2 heats the hydrogen recirculation pump 12.

When the heating control of the hydrogen recirculation pump 12 is performed, the rotational speed of the hydrogen recirculation pump 12 is held at a predetermined value, and the rotational speed of the pump-cooling circulation pump 17 in the pump-cooling path L4 is decreased. Accordingly, less heat generated at the hydrogen recirculation pump 12 is taken away in the cooling water of the pump-cooling path L4 and dissipated from the radiator 18.

With this configuration, similarly to the first embodiment, the condensed water is generated more in the piping of the hydrogen recirculation path L2 than in the hydrogen recirculation pump 12 at a low temperature during the standing after the system is stopped. Accordingly, the condensed water can be prevented from adhering to the hydrogen recirculation pump 12. Also, with this embodiment, a heater or the like for heating does not have to be provided. Accordingly, the configuration of the system can be simplified. Further, although the temperature of the hydrogen recirculation pump 12 may increase more slowly as compared when a heater or the like is used, by increasing the time period for the heating control, the condensed water can still be prevented from adhering to the hydrogen recirculation pump 12 with a simpler configuration.

It is noted that the modified arrangement in the third embodiment for the first embodiment may be applied to other embodiments described below.

Fourth Embodiment

Figure 8:
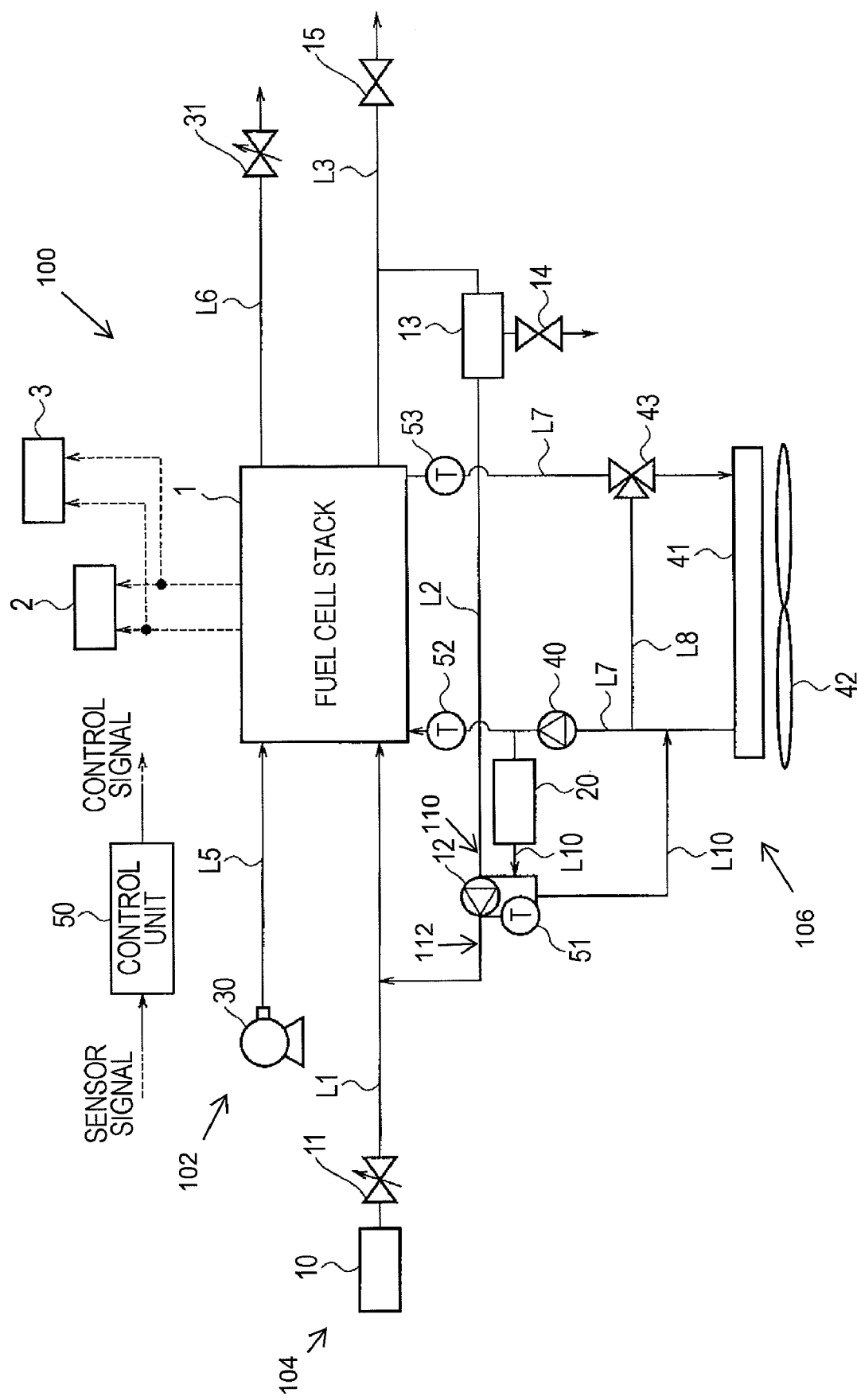
FIG. 8 is a block diagram showing a configuration of a fuel cell system according to a fourth embodiment of the invention.

FIG. 8 is a block diagram showing a configuration of a fuel cell system 100 according to a fourth embodiment. The fuel cell system 100 of the fourth embodiment is different from that of the first embodiment in that the cooling system 106 of the hydrogen recirculation pump 12 and the cooling system of the fuel cell stack 1 share coolant and a portion of the same path.

A pump-cooling path L10 in this embodiment is split from a portion of the stack-cooling path L7 located downstream of the stack-cooling circulation pump 40, and is connected to the hydrogen recirculation pump 12. Also, the pump-cooling path L10 passes through the hydrogen recirculation pump 12, and then rejoins the stack-cooling path L7 at a portion thereof located upstream of the stack-cooling circulation pump 40.

In this configuration, during heating control of the hydrogen recirculation pump 12, the heater 20 heats the coolant as in the first embodiment. In particular, when heating is started, the temperature of the cooling water is equivalent to the stack inlet temperature. As a result, the required increase in temperature of the hydrogen recirculation pump 12 may be smaller than when the cooling system of the hydrogen recirculation pump 12 is independently provided. Thus, the difference between the temperature of the hydrogen recirculation pump 12 and the temperature of the fuel cell stack 1 can be increased more quickly to a value equal to or higher than the determination temperature ΔTth. Also, by controlling the three-way valve 43 in the stack-cooling path L7 such that the cooling water flows through the bypass path L8, the coolant (and thus the hydrogen recirculation pump 12) can be efficiently heated. While the cooling water receives heat by the heater 20, the heat capacity of the hydrogen recirculation pump 12 is smaller than the heat capacity of the fuel cell stack 1. Thus, the temperature of the hydrogen recirculation pump 12 increases faster than temperature of the fuel cell stack 1 does.

Figure 9:
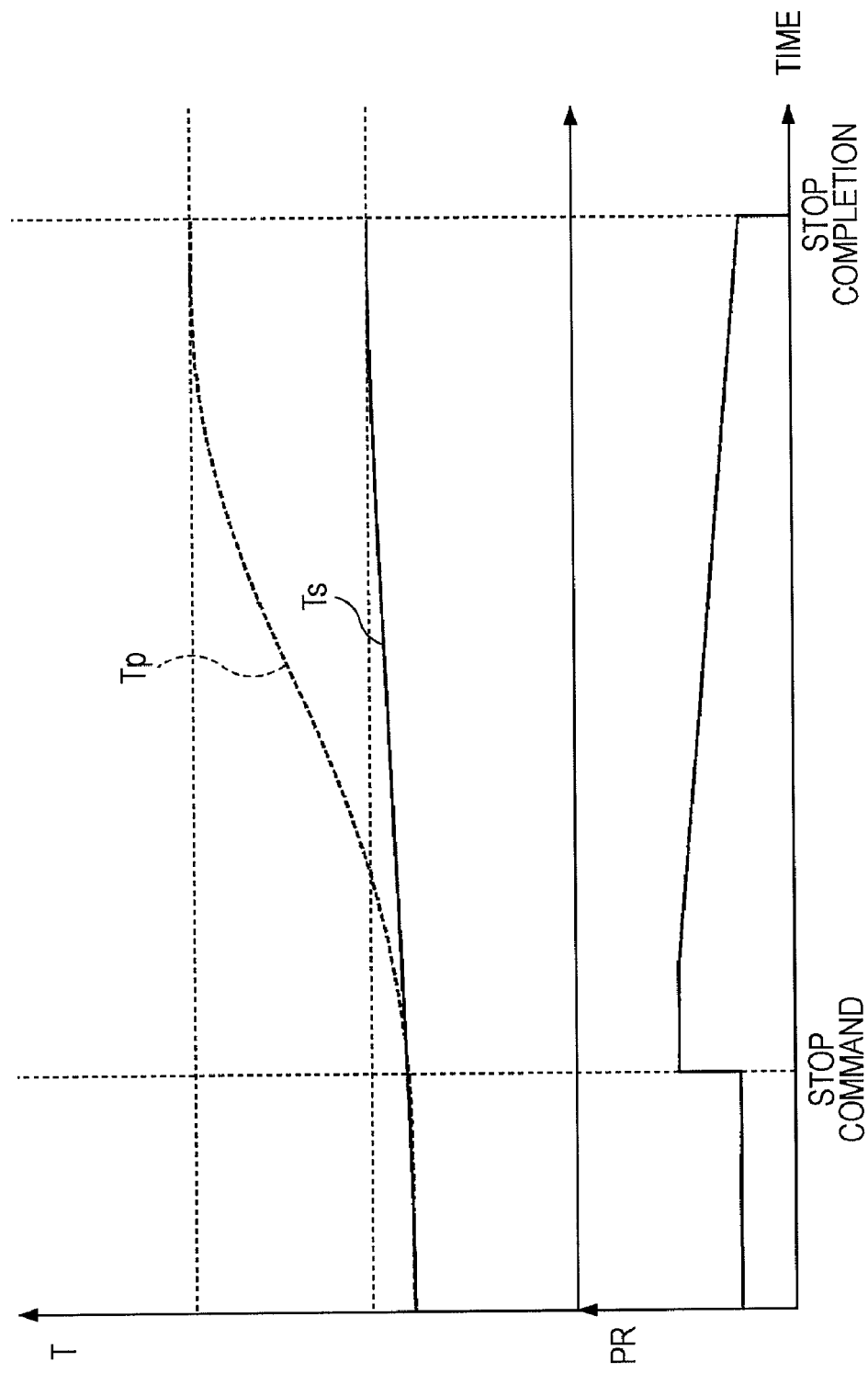
FIG. 9 is an explanatory diagram showing the relationship between the rotational speed and the temperature of the reactant gas recirculation pump during rotational control of the reactant gas recirculation pump.

Rotational control of the hydrogen recirculation pump 12 in this embodiment is similar to that of the first embodiment. FIG. 9 is an explanatory diagram showing the relationship between the rotational speed PR and the temperature Tp of the hydrogen recirculation pump 12 during rotational control of the hydrogen recirculation pump 12. In particular, in an initial phase of the heating control of the hydrogen recirculation pump 12 during the stop process, the hydrogen recirculation pump 12 is controlled such that the rotational speed is set to a higher value than that during normal power generation. Then, the hydrogen recirculation pump 12 is controlled by decreasing the rotational speed of the hydrogen recirculation pump 12, for example in a linear manner, as the temperature of the hydrogen recirculation pump 12 increases. With this control, the pump temperature Tp of the hydrogen recirculation pump 12 is prevented from increasing to such a temperature as to exceed a temperature at which the performance of the hydrogen recirculation pump 12 degrades, or at which the pump 12 ceases to function properly. Accordingly, as shown in FIG. 9, the temperature of the hydrogen recirculation pump 12 can increase gradually.

With this configuration, similarly to the first embodiment, condensed water is generated more in the piping of the hydrogen recirculation path L2 than in the hydrogen recirculation pump 12 at a low temperature during standing after the system is stopped. Accordingly, the condensed water can be prevented from adhering to the hydrogen recirculation pump 12. Also, an independent cooling system for cooling the hydrogen recirculation pump 12, for example, a element such as a radiator, a fan, or a pump-cooling circulation pump, is not necessary. The cost and weight of the entire system can be reduced, and the configuration of the system can be simplified.

Fifth Embodiment

Figure 10:
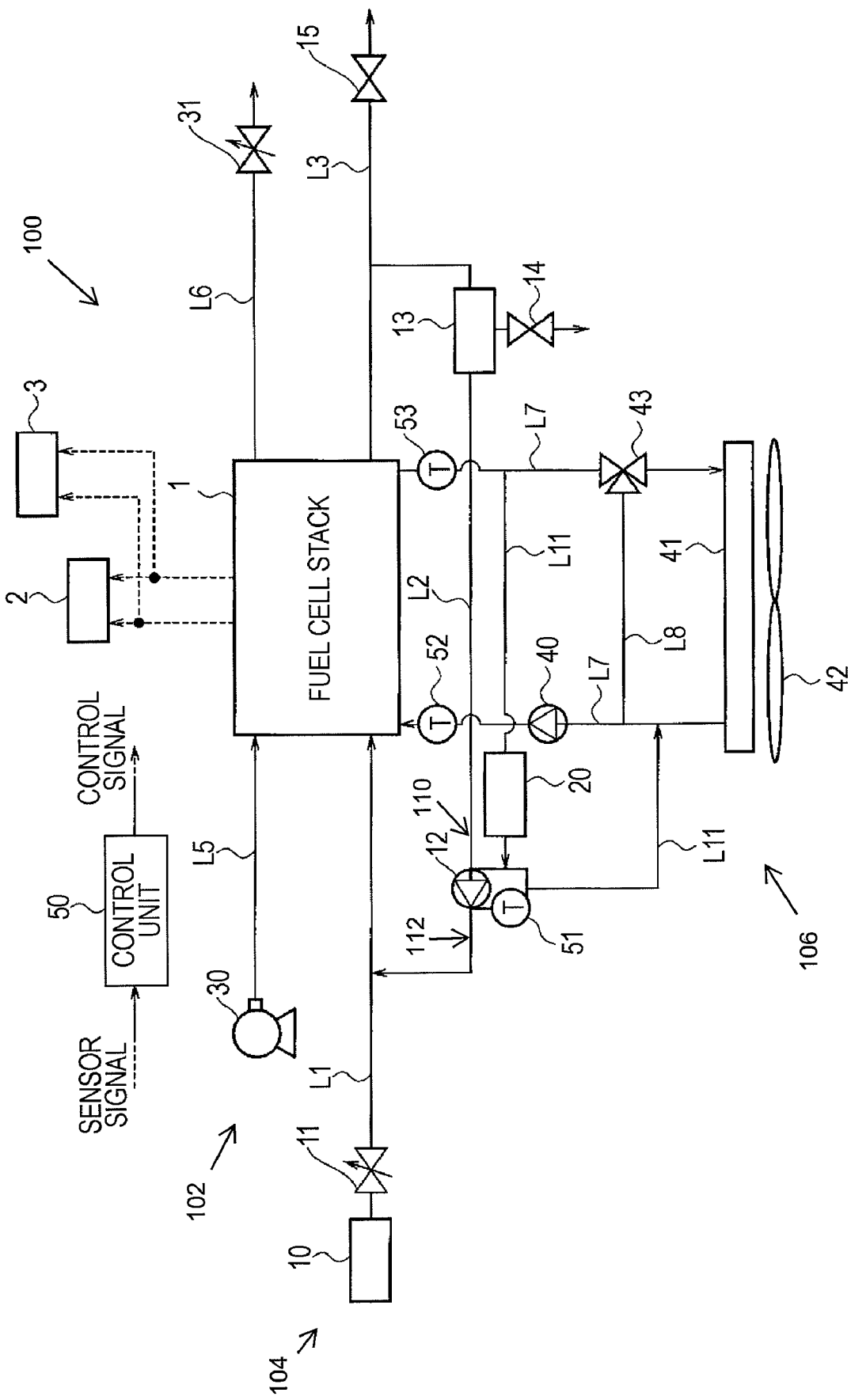
FIG. 10 is a block diagram showing a configuration of a fuel cell system according to a fifth embodiment of the invention.

FIG. 10 is a block diagram showing a configuration of a fuel cell system 100 according to a fifth embodiment. The fuel cell system 100 of the fifth embodiment is different from that of the first embodiment in that the cooling system of the hydrogen recirculation pump 12 and the cooling system of the fuel cell stack 1 share coolant and a portion of the same path.

A pump-cooling path L11 in this embodiment is split from a portion of the stack-cooling path L7 located downstream of the fuel cell stack 1, and is connected to the hydrogen recirculation pump 12. Also, the pump-cooling path L11 passes through the hydrogen recirculation pump 12, and then rejoins the stack-cooling path L7 at a portion thereof located upstream of the stack-cooling circulation pump 40.

As described in the first embodiment, the fuel cell stack 1 generates power during the stop process. Hence, in the stack-cooling path L7, the temperature of the cooling water located downstream of the fuel cell stack 1 becomes higher than the temperature of the cooling water located upstream of the fuel cell stack 1. Thus, as compared with the fourth embodiment, the difference between the temperature of the hydrogen recirculation pump 12 and the temperature of the fuel cell stack 1 is quickly increased to a value equal to or higher than the determination temperature ΔTth.

Also, when a portion of the hydrogen recirculation path L2 near the outlet of the fuel cell stack 1 corresponds to a portion of the stack-cooling path L7 near the inlet of the fuel cell stack 1, during the normal operation, a temperature relationship is established wherein $T1 \leq T2 \leq T3 \leq T4$, where T1 is the temperature of circulation gas in the hydrogen recirculation path L2, T2 is the stack inlet temperature, T3 is the stack outlet temperature, and T4 is the temperature of the pump-cooling path L4 near the inlet of the hydrogen recirculation pump 12.

Accordingly, when the heating control of the hydrogen recirculation pump 12 is to be performed, the required increase in temperature becomes small, and the heating control can be performed within a short time.

Although cooling water at a high temperature may be supplied to the hydrogen recirculation pump 12 during normal operation, the performance of the hydrogen recirculation pump 12 can be prevented from deteriorating by increasing the flow rate of cooling water to the hydrogen recirculation pump 12.

The fuel cell system and the control method thereof have been described according to the foregoing embodiments. However, the present invention is not limited to the above-described embodiments, and may include various modifications within the scope of the present invention.

For example, while power generated by the fuel cell system is used as much as possible in any of the embodiments, if the power is not enough, power of a battery may be used. Also, to further enhance the heat-retaining property of the hydrogen recirculation pump 12, a heat insulator may be attached onto the surface of the hydrogen recirculation pump 12, or a heat insulator may be inserted at a holding point of the hydrogen recirculation pump 12. In view of the structure of the hydrogen recirculation pump 12, it is desirable that a cooling portion of the hydrogen recirculation pump 12 is thermally conducted to a circulation portion (for example, an impeller or a volute) for pumping hydrogen. In this case, the heat contained in the cooling water for the hydrogen recirculation pump 12 is efficiently transmitted to the circulation portion. Hence, adhesion of condensed water can be prevented and freezing and locking up of the circulation portion can be prevented. Alternatively, coolant may flow through the circulation portion (volute).

Also, while the circulation system corresponding to the fuel electrode of the fuel cell stack 1 is provided in any of the above-described embodiments, the present invention is not limited thereto. For example, to properly perform temperature control, in a configuration having a circulation system corresponding to the oxidizer electrode of the fuel cell stack 1, in which a part of exhaust passing through the oxidizer electrode of the fuel cell is combined with the air primarily supplied to the oxidizer electrode, the antifreezing control may be applied to a pump unit which causes oxidizing gas to be circulated.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

What is claimed is:

1. A fuel cell system comprising:
a fuel cell for causing reactant gas to be electrochemically reacted to generate power when reactant gas is supplied;
a reactant gas supply path for supplying reactant gas to the fuel cell;
a reactant gas recirculation path for recirculating exhaust gas discharged from the fuel cell and combining the recirculating exhaust gas with reactant gas flowing through the reactant gas supply path to the fuel cell;
a pump unit disposed in the reactant gas recirculation path to pump the recirculating exhaust gas through the reactant gas recirculation path;
a pump-tempering apparatus for increasing the temperature of the pump unit; and
a controller for controlling the pump-tempering apparatus;
wherein the controller is programmed to receive a fuel cell system stop signal and to then control the pump-tempering apparatus such that the temperature of the pump unit becomes higher than the temperature of piping in the reactant gas recirculation path.

2. The fuel cell system according to claim 1, wherein the controller is programmed to stop the supply of reactant gas to the fuel cell and to perform heating control by causing the pump-tempering apparatus to heat the pump unit using power generated by the fuel cell after the supply of reactant gas to the fuel cell has been stopped.

3. The fuel cell system according to claim 2, wherein the controller is programmed to perform heating control with power generated by the fuel cell using at least reactant gas remaining in the fuel cell, after the supply of reactant gas to the fuel cell has been stopped.

4. The fuel cell system of claim 1, wherein the pump-tempering apparatus further comprises:
a pump-cooling path;
a pump-cooling circulation pump for circulating coolant through the pump-cooling path to the pump unit; and
a coolant heating unit for heating the coolant circulated in the pump-cooling path;
wherein the controller is programmed to control the coolant heating unit to heat the coolant.

5. The fuel cell system according to claim 1, wherein the pump-tempering apparatus is configured to heat the pump unit by allowing heat generated by the pumping operation of the pump unit to accumulate in the pump unit.

6. The fuel cell system according to claim 4, wherein the pump-tempering apparatus further comprises:
a pump-cooling unit for cooling coolant circulated to the pump unit in the pump-cooling path;
a bypass path in the pump-cooling path, the bypass path bypassing the pump-cooling unit; and
a switching device capable of switching coolant flow between the bypass path and the pump-cooling unit;
wherein the controller is programmed to control tempering apparatus by switching coolant flow to the bypass path using the switching device.

7. The fuel cell system according to claim 1, further comprising:
a pump temperature detector for detecting the temperature of the pump unit; and
a fuel cell temperature detector for detecting the temperature of the fuel cell;
wherein the controller is programmed to control the pump-tempering apparatus by performing heating control until the difference between the temperature detected by the pump temperature detector and the temperature detected by the fuel cell detector increases to an amount equal to or greater than a preset determination temperature.

8. The fuel cell system according to claim 1, the pump unit being rotationally driven, wherein the controller is programmed to perform rotational control of the pump unit after the controller receives a fuel cell stop signal, by decreasing the rotational speed of the pump unit below the rotational speed of the pump when the stop signal was received, as the temperature of the pump unit increases.

9. The fuel cell system according to claim 1, wherein the reactant gas recirculation path has an upstream portion and a downstream portion with respect to the pump unit, the upstream and downstream portions having a reduced wall thickness compared with that of the pump-cooling path through the pump unit.

10. The fuel cell system according to claim 1, further comprising:
a fuel-cell-cooling path separate from the reactant gas supply path and the reactant gas recirculating path for providing flow of a coolant to the fuel cell; and
a fuel-cell-cooling unit for cooling the coolant provided to fuel cell in the fuel-cell-cooling path;
a pump-cooling path for providing flow of the coolant to the pump unit, wherein the pump-cooling path and the fuel-cell-cooling path are interconnected.

11. A fuel cell system comprising:
a fuel cell for causing reactant gas to be electrochemically reacted to generate power when reactant gas is supplied;
a reactant gas supply path for supplying reactant gas from a reactant gas supply unit to the fuel cell;
a reactant gas recirculation path for recirculating exhaust gas discharged from the fuel cell and combining the recirculating exhaust gas with reactant gas flowing through the reactant gas supply path to the fuel cell;
a pump unit disposed in the reactant gas recirculation path to pump the recirculating exhaust gas through the reactant gas recirculation path;
a pump-tempering apparatus for increasing the temperature of the pump unit; and
a controller programmed to perform heating control by causing the pump-tempering apparatus to heat the pump unit using power generated by the fuel cell after the supply of the reactant gas has been stopped based on the controller receiving a fuel cell system stop signal.

12. A stop control method of a fuel cell system, the fuel cell system including a fuel cell for causing reactant gas to be electrochemically reacted to generate power when reactant gas is supplied, a reactant gas supply path for supplying reactant gas to the fuel cell, a reactant gas recirculation path for recirculating exhaust gas discharged from the fuel cell and combining the recirculating exhaust gas with reactant gas flowing through the reactant gas supply path to the fuel cell, and a pump unit disposed in the reactant gas recirculation path to pump the recirculating exhaust gas through the reactant gas recirculation path, the stop control method comprising:
after a fuel cell system stop signal is received, increasing the temperature of the pump unit such that the temperature of the pump unit becomes higher than the temperature of piping in the reactant gas recirculation path; and
stopping the fuel cell system after the pump unit temperature becomes higher than the piping temperature of the reactant gas recirculation path.

13. The stop control method according to claim 12, wherein stopping the fuel cell system includes stopping the supply of reactant gas to the fuel cell, and wherein increasing the temperature of the pump unit includes heating the pump unit using power generated by the fuel cell after the supply of reactant gas to the fuel cell has been stopped.

14. The stop control method according to claim 13, wherein heating the pump includes using power generated by the fuel cell in consuming at least reactant gas remaining in the fuel cell, after the supply of reactant gas to the fuel cell has been stopped.

15. The stop control method according to claim 12, wherein increasing the temperature of the pump unit includes circulating coolant flow to the pump unit and heating the coolant circulated to the pump unit, thereby heating the pump unit.

16. The stop control method according to claim 12, wherein increasing the temperature of the pump unit includes allowing heat generated by the pumping operation of the pump unit to accumulate in the pump unit.

17. The stop control method according to claim 15, wherein increasing the temperature of the pump unit further comprises switching the coolant flow circulated to the pump unit from flowing through a pump-cooling unit to flowing through a pump-cooling unit bypass path.

18. A fuel cell system comprising:
    a fuel cell for causing reactant gas to be electrochemically reacted to generate power when reactant gas is supplied;
    reactant gas supply means for supplying reactant gas to the fuel cell;
    reactant gas recirculating means for enabling exhaust gas discharged from the fuel cell to be recirculated and combined with reactant gas flowing to the fuel cell;
    pump means for recirculating exhaust gas in the reactant gas recirculating means;
    pump-tempering means for increasing the temperature of the pump means; and
    control means for controlling the pump-tempering means;
    wherein the control means is programmed to receive a fuel cell system stop signal and to respond to the fuel cell system stop signal by controlling the pump-tempering means such that the temperature of the pump means becomes higher than the temperature of piping of the reactant gas recirculating means.

19. The fuel cell system according to claim 1, further comprising:
    a gas-liquid separator located in the reactant gas recirculation path upstream of the pump unit for removing moisture from the recirculating exhaust gas.

20. The fuel cell system according to claim 1, wherein the pump-tempering apparatus includes a pump-cooling path and a pump-cooling circulation pump for circulating coolant through the pump-cooling path to the pump unit.

21. The fuel cell system of claim 18, wherein the pump-tempering apparatus includes a pump-cooling path and a pump-cooling circulation pump for circulating coolant through the pump-cooling path to the pump unit.

* * * * *